July 18, 1933.    B. E. CLARKSON    1,918,381
CABLE CONNECTING AND SEALING MEANS
Filed June 7, 1928    2 Sheets-Sheet 1

INVENTOR
B. E. Clarkson
BY
C. F. Heinkel
ATTORNEY

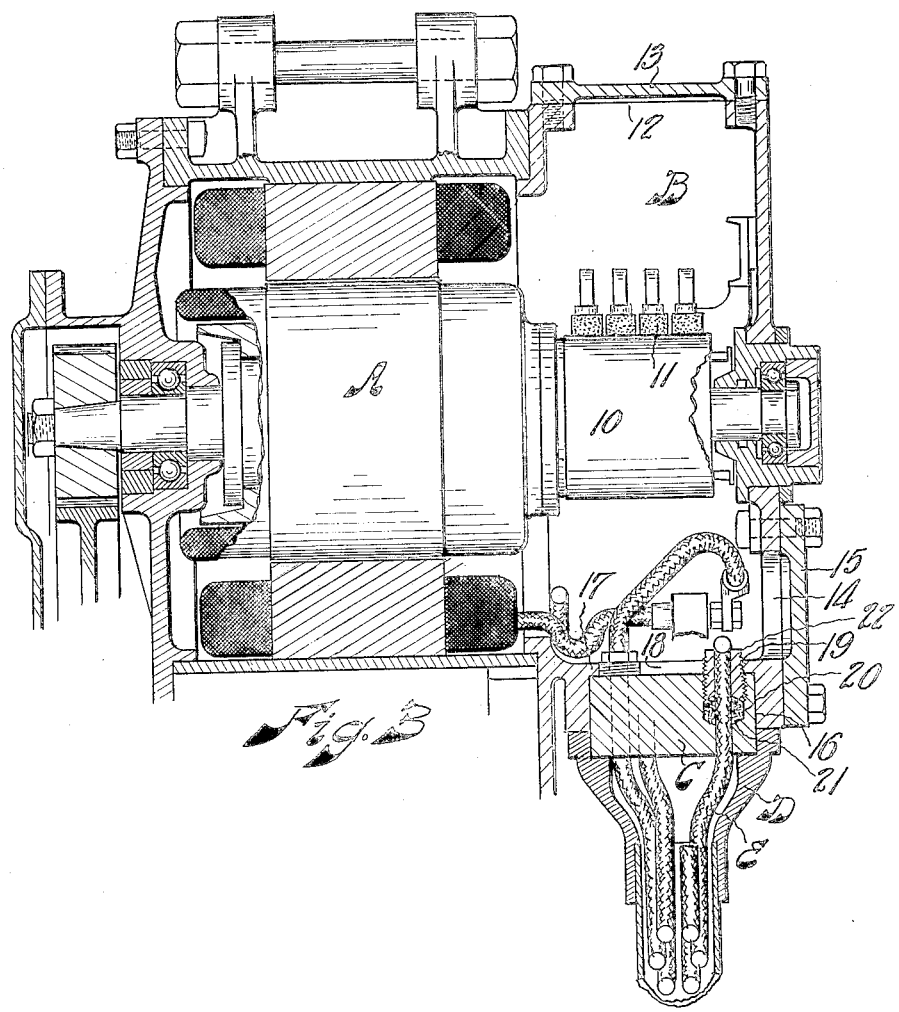

Patented July 18, 1933

1,918,381

UNITED STATES PATENT OFFICE

BRADLEY E. CLARKSON, OF CLEVELAND, OHIO, ASSIGNOR TO ATLAS BOLT & SCREW COMPANY, OF CLEVELAND, OHIO

CABLE CONNECTING AND SEALING MEANS

Application filed June 7, 1928. Serial No. 283,662.

My invention relates to cable connecting and sealing means generally and more particularly to means for sealing chambers or casings against flame or spark leaving the same.

Objects of my invention are to provide a simple, inexpensive, efficient, easily operable, means for effectively sealing a cable at the entrance thereof into a casing and to provide a means whereby the cable can be assembled and disassembled and attached to and from a casing in the most easy and economical manner. Other objects will be pointed out in the herein following description of my invention, or will appear, or become apparent, or will suggest themselves upon an inspection of the accompanying drawings and from the description mentioned.

The present invention aims to prevent the flame of ignited gas or sparks inside of an inclosure from traveling to the outside of the same.

In many instances as in electric locomotives for mines for instance where explosive or inflammable gas is present, or in instances where a spark or a flame would be dangerous or disadvantageous, it is quite desirable that an apparatus which does or may create a spark or a flame be inclosed and sealed in the inclosure to prevent the same from igniting substances outside of the inclosure. In many instances of electric motor installation, as in the installation shown in the accompanying drawings for instance, long electric leads are necessary and it is quite desirable that there are as few joints as possible in these leads. Since it is necessary to seal these leads where they enter an inclosure and since joints therein are objectionable, these long leads would have to be drawn through openings and, in order to permit them to be so drawn through the openings, they must fit rather loosely in these openings and therefore, would not be sealed in these openings. In order to overcome this disadvantage, I provide a sealing means in this opening so that the leads can be drawn through these openings easily and conveniently and without danger to the insulation on these leads and sealed effectively after they are in position.

My invention aims to provide the necessary means to produce such sealing effectively and to provide means whereby the sealing can be maintained effectively and to provide an easy and economical means for assembling and disassembling.

In order to illustrate my invention, I have selected, for illustration and not for limiting purposes, an electric motor having the leads thereof sealed in a casing, as is often used on electric locomotives for mines, and have shown the same in the accompanying drawings but I am aware that my invention is applicable to other devices of a similar nature or operating under equivalent conditions.

In the accompanying drawings mentioned:—

Fig. 3 is a section taken in a longitudinal plane indicated by the line 3—3 in Fig. 2 and shows longitudinal relations of parts more clearly.

Similar reference characters refer to similar parts throughout the views.

Figures 1, 2:
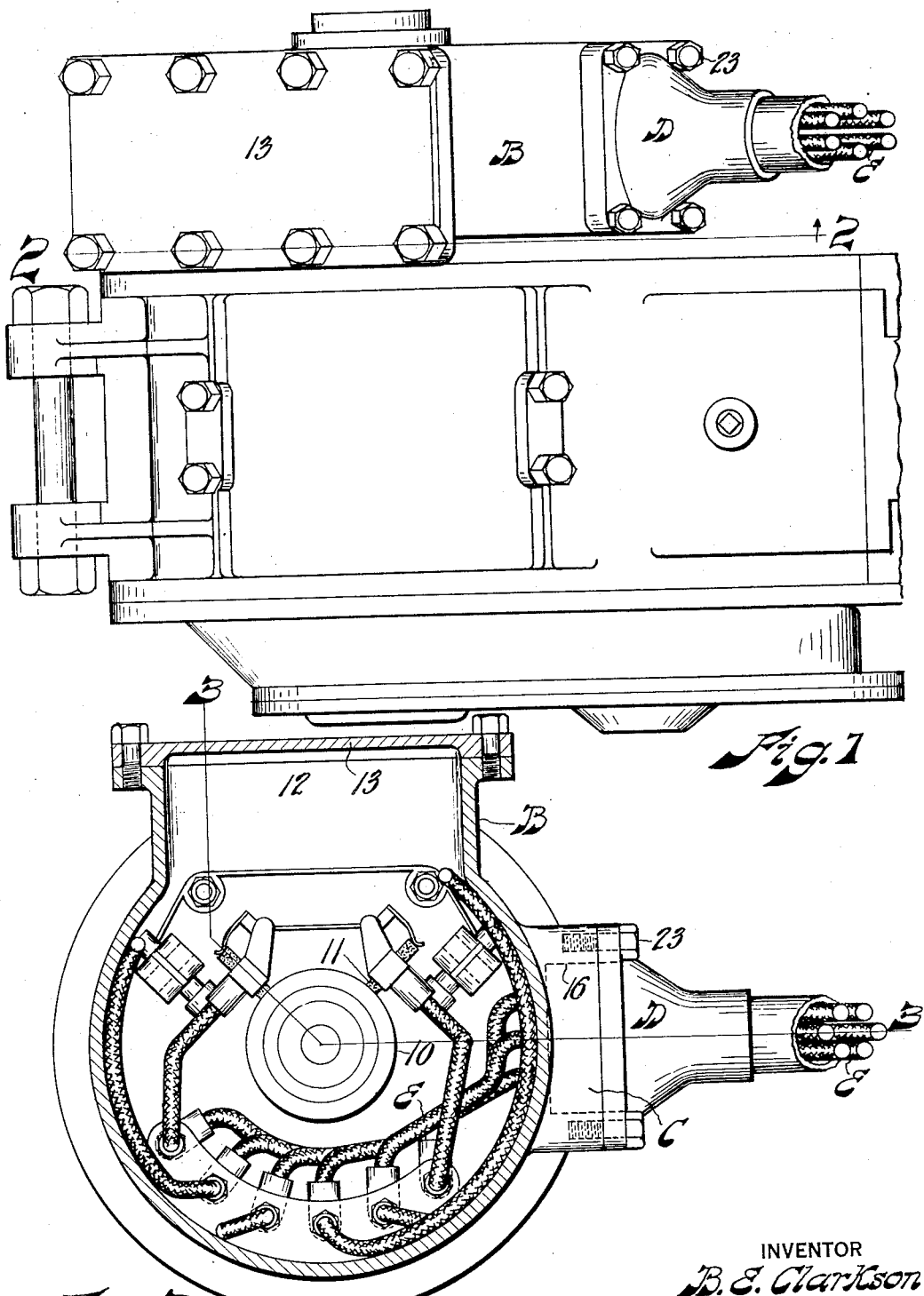
Fig. 1 is a plan view of a motor having one end of a sealed one unit cable removably connected to the commutator end thereof.
Fig. 2 is a section taken in a transverse plane indicated by the line 2—2 in Fig. 1 and shows transverse relations of parts more clearly.

The electric motor A is shown as having the commutator 10 and the brushes 11 and as being inclosed in the casing B which is normally closed all around.

The casing is shown with the inspection opening 12 in a wall thereof and normally closed by the cover 13 which is removable to provide a means of access to the interior of the casing particularly to the commutator and to the brushes.

The casing is also shown with the opening 14 in a wall thereof and normally closed by the cover 15 which is removable to provide a means of access to the interior of the casing, particularly to the lead connections and the sealing means to be described later herein.

The casing is also shown with the socket 16 in a wall thereof adjacent to the opening 14 and having the shoulder or bottom 17 and the opening 18 through this bottom.

The block C fits into the socket 16 and abuts the bottom 17 and sealably closes the socket and, in the present instance, has six openings through the same.

The cap D holds the block in position in the socket and is removable to permit the block to be removed when desired and to assist in the assembling and disassembling of the lead elements.

In each of the six openings, the gland 19 is shown as threaded into the inner end of the opening with the inner end of the gland bearing against the packing 20 which abuts the shoulder 21 in the opening. Each lead E extends through the cap and the block and the packing and the gland and into the interior of the casing where it is suitably connected to a part of the motor or other current conveying means.

The conduit 24 extends into the outer end of the cap and the leads are confined therein outwardly of the cap.

As to the operation of the apparatus shown and described:—

When the motor A is in operation, sparks or flames are or may be created between the commutator and the brushes thereof and these sparks or flames may ignite gaseous substances in the casing but, since the casing is normally closed all around and sealed, this ignited substance can not leave the casing and, therefore, these sparks or flames can cause no explosion or ignition of substances outside of the casing.

As to assembling and disassembling:—

The leads E can easily be drawn through the block and into any desirable position while the glands and the packing are loose either while the block is held in position on the casing or while the same is removed from the casing.

After the leads are in position in the block and while the block is removed from the casing, the glands are screwed inwardly of the block by means of the polygonal ends 22 thereon and thereby compress the packing and effect a seal between the block and each lead and the pressure resisting effect of this seal can be carried to any desired degree by appropriate manipulation of the glands.

After the leads are suitably fixed in the block, the block is placed into the socket and the cap is superimposed over the block and holds the same in position in the socket by means of the screws 23.

When the block remains in position on the casing, the leads can also be easily drawn through the openings through the same while the packing and the glands are loose. After the leads are in position, the sealing of the leads can be effected by manipulation of the glands by means of a wrench reaching through the opening 14 while the cover 15 is removed.

The covers 13 and 15 are removable to provide a means for accessibility to the interior of the casing for purposes of inspection or making or tightening connections or other purposes.

My invention provides an effective sealing means as well as a means of easy and convenient assembling and disassembling and inspection of and accessibility to parts inside of the casing one application of which is shown and described herein but I am aware that my invention is applicable in apparatus other than the one shown and described and that changes and modifications can be made in the structure as well as in the arrangement of elements shown and described within the scope of the appended claims; therefore, without limiting myself to the precise application of my invention nor to the precise structure and arrangement of elements as shown and described.

I claim:—

1. In combination, a casing having a socket in the wall thereof and opening into the casing, a block in said socket closing said casing, electric apparatus in said casing, a plurality of leads for said apparatus each extending through an individual hole through said block, and a stuffing box for each of said leads carried by said block.

2. In combination, a casing having a socket in the wall thereof and opening into the casing, a block in said socket closing said casing, electric apparatus in said casing, a lead for said apparatus extending through said block, a stuffing box for said lead carried by said block, a removable cap to hold said block in said socket, and a securing means to removably hold said cap onto said casing.

3. In combination, a casing having a socket in the wall thereof and opening into the casing, a block in said socket closing said casing, electric apparatus in said casing, a plurality of leads for said apparatus each extending through an individual hole through said block, a stuffing box for each of said leads carried by said block, a removable cap to hold said block in said socket and confining all of said leads, and a securing means to removably hold said cap onto said casing.

4. In combination, a casing having a socket in the wall thereof and opening into the casing, a block in said socket closing said casing, electric apparatus in said casing, a lead for said apparatus extending through said block, an opening through the wall of said casing adjacent to the inner end of said socket, a removable cover for said opening, and a stuffing box for said lead carried by said block and having the adjusting end thereof inwardly of said casing for access thereto through said opening.

5. In combination, a casing having a socket in the wall thereof and opening into the casing, a block in said socket closing said casing, electric apparatus in said casing, a plurality of leads for said apparatus each extending through an idividual hole through said block, an opening through the wall of said casing adjacent to the inner end of said socket, a removable cover for said opening, and a stuffing box for each of said leads carried by said block and each having the adjusting end thereof inwardly of said casing for access thereto through said opening.

6. In combination, a casing having a socket in the wall thereof and opening into the casing, a block in said socket closing said casing, electric apparatus in said casing, a plurality of leads for said apparatus each extending through an individual hole through said block, an opening through the wall of said casing adjacent to the inner end of said socket, a removable cover for said opening, a stuffing box for each of said leads carried by said block and each having the adjusting end thereof inwardly of said casing for access thereto through said opening, a removable cap to hold said block in said socket and confining all of said leads, and a securing means to removably hold said cap onto said casing.

7. In combination, a casing having a socket in the wall thereof and opening into the casing, a block in said socket closing said casing, electric apparatus in said casing, a plurality of leads for said apparatus each extending through an individual hole through said block, a stuffing box for each of said leads carried by said block and each having the adjusting end thereof inwardly of said casing, an opening through the wall of said casing adjacent to the inner end of said socket, a cover for said opening removable for access to said stuffing boxes, a securing means to removably hold said cover onto said casing, an inspection opening through the wall of said casing, a cover for said inspection opening removable for access to said apparatus, a removable cap to hold said block in said socket and confining all of said leads, and a securing means to removably hold said cap onto said casing.

8. In combination, a casing having an opening through a wall thereof with a cable connecting means including a block confining an end of the cable, an adjustable sealing means between the cable and the block and having the operating end thereof within the casing, and a cap adapted to engage said block to hold the same to the casing and over the opening and release the same from the casing for removal of the cable end.

9. In combination, a casing containing electric apparatus and having an opening through a wall thereof with a connecting means for a cable having a plurality of lead wires for said electric apparatus including a block confining each one of said lead wires individually and leaving the ends thereof free for connection to said electric apparatus, a cap adapted to engage said block to hold the same to the casing and over the opening and to release the same from the casing for removal of the block and the lead wire ends from the casing, and a conduit for the lead wires extending from said cap.

10. In combination, a casing containing electric apparatus and having an opening through a wall thereof with a connecting means for a cable having a plurality of lead wires for said electric apparatus including a block releasably confining each one of said lead wires individually and leaving the ends thereof free for connection to said electric apparatus, a cap adapted to engage said block to hold the same to the casing and over the opening and to release the same from the casing for removal of the block and the lead wire ends from the casing, and a conduit for the lead wires extending from said cap.

11. In combination, a casing containing electric apparatus and having an opening through a wall thereof with a connecting means for a cable having a plurality of lead wires for said electric apparatus including a block sealably and releasably confining each one of said lead wires individually and leaving the ends thereof free for connection to said electric apparatus, a cap adapted to engage said block to hold the same to the casing and over the opening and to release the same from the casing for removal of the block and the lead wire ends from the casing, and a conduit for the lead wires extending from said cap.

B. E. CLARKSON.